(12) United States Patent
Choong et al.

(10) Patent No.: US 8,422,401 B1
(45) Date of Patent: Apr. 16, 2013

(54) AUTOMATED COMMISSIONING OF WIRELESS DEVICES

(75) Inventors: Jason Yew Choo Choong, San Jose, CA (US); Dallas Ivanhoe Buchanan, III, Kentfield, CA (US); Peter Graeme Cobb, Wonga Park (AU)

(73) Assignee: Daintree Networks, Pty. Ltd., Scoresby (AU)

( * ) Notice: Subject to any disclaimer, the term of this patent is extended or adjusted under 35 U.S.C. 154(b) by 298 days.

(21) Appl. No.: 12/900,960

(22) Filed: Oct. 8, 2010

Related U.S. Application Data

(60) Provisional application No. 61/333,559, filed on May 11, 2010.

(51) Int. Cl.
*H04L 12/28* (2006.01)
(52) U.S. Cl.
USPC ............................ 370/254; 370/328; 370/338
(58) Field of Classification Search .................. 370/241, 370/254, 328, 338, 392
See application file for complete search history.

(56) References Cited

U.S. PATENT DOCUMENTS

| | | | |
|---|---|---|---|
| 7,400,594 B2 * | 7/2008 | Pereira et al. ................. | 370/310 |
| 7,483,397 B2 * | 1/2009 | Meier et al. .................... | 370/256 |
| 7,508,811 B2 * | 3/2009 | Shao et al. ..................... | 370/347 |
| 7,558,557 B1 * | 7/2009 | Gollnick et al. ........... | 455/343.4 |
| 7,881,239 B2 * | 2/2011 | Pister et al. .................... | 370/311 |
| 8,213,362 B2 * | 7/2012 | Lee et al. ....................... | 370/328 |
| 2007/0183360 A1 * | 8/2007 | Arunan et al. ................ | 370/328 |
| 2007/0258508 A1 * | 11/2007 | Werb et al. .................... | 375/140 |
| 2008/0056261 A1 * | 3/2008 | Osborn et al. ................ | 370/392 |
| 2008/0068156 A1 * | 3/2008 | Shimokawa et al. ..... | 340/539.22 |
| 2008/0089277 A1 * | 4/2008 | Alexander et al. ............ | 370/328 |
| 2009/0066473 A1 | 3/2009 | Simons | |
| 2011/0046792 A1 * | 2/2011 | Imes et al. ..................... | 700/278 |

OTHER PUBLICATIONS

Dugas, C., "Configuring and managing a large-scale monitoring network: solving real world challenges for ultra-low-powered and long-range wireless mesh networks" Int. J. Network Mgmt, 15: pp. 269-282, 2005.

Maleysson & Dugas, "Configuring and managing a large-scale monitoring network. Solving real world challenges for Ultra Low Powered and long-range wireless mesh networks" Joint sOc-EUSAI Conf., 6 pages. 2005.

Teasdale et al., Final Report: "Adapting Wireless Technology to Lighting Control and Environment Sensing" Final Report, pp. 1-54, 2006.

* cited by examiner

*Primary Examiner* — Dang Ton
*Assistant Examiner* — Brian O Connor
(74) *Attorney, Agent, or Firm* — Fish & Richardson P.C.

(57) ABSTRACT

Methods, systems, and apparatus, including computer programs encoded on a computer storage medium, for commissioning a wireless network in an automated fashion. The method includes accessing zone configuration data specifying zones in a wireless network and further specifying, for each zone, wireless devices that belong to the zone; in response to a first physical stimulus in an area, receiving sensor data from a first sensor device in the area and generating the sensor data in response to sensing the first physical stimulus, the first sensor device not belonging to a zone and the area being an area in which are located other wireless devices belonging to a first zone; generating a commissioning event for the first zone; and in response to the sensor data and the commissioning event, updating the zone configuration data so that the zone configuration data specifies that the first sensor device belongs to the first zone.

20 Claims, 7 Drawing Sheets

US 8,422,401 B1

AUTOMATED COMMISSIONING OF WIRELESS DEVICES

CLAIM OF PRIORITY

This application claims priority under 35 U.S.C. §119(e) to U.S. Patent Application Ser. No. 61/333,559, filed on May 11, 2010, the entire contents of which are hereby incorporated by reference.

BACKGROUND

This specification relates to commissioning wireless networks.

Wireless networks are configured according to wireless protocols. Commissioning is the process of setting up a wireless network. In its broadest sense, commissioning covers a wide range of tasks including surveying the radio and physical environment, placement of devices, configuration of parameters, and testing and verification of correct operation. Often, non-technical and semi-technical issues need to be considered when commissioning, including the skills and workflow practices of the installer, the ease and identification and accessibility of devices, the naming conventions of the users, and the interoperability and co-existence with other wireless or wired systems.

Commissioning tools are designed to facilitate commissioning of wireless networks for installers. The commissioning tools typically run on a laptop or handheld device, and provide visualization of the network and devices, and provide options to configure, commission and manage the wireless system.

Commissioning tools typically include a variety of features and functions. The exact requirements for a particular commissioning tool will vary depending on the type of device and application being commissioned, the environment into which it is being deployed, and the wireless protocol standard(s) being used. For example, a commissioning tool typically includes an easy to use interface that hides the complexity of the underlying technology. The commissioning tool may also facilitate start-up commissioning and membership commissioning. Start-up commissioning is used to configure devices with the settings required to join (or start) their intended network, and membership commissioning is used to control which devices are permitted to join a specific network.

As the number of controlled circuits in a building increases, so does the complexity of the commissioning process, as each of the wireless devices need to be commissioned onto a wireless network and assigned to the appropriate controllable zone for control. FIG. 1A is a block diagram 80 illustrating network controlled circuits arranged by zones and network segments 82, 84 and 86 according to a floor plan. The diagram 80 illustrates three wireless network segments (i.e., three independent wireless networks that are intended to be operated as part of the overall system). Devices that are on different wireless network segments cannot communicate to each other wirelessly, except by means of a gateway.

The segments each include wireless devices configured according to multiple zones, the latter of which are logical groupings of wireless devices that facilitate control of the devices as a single entity. For example, a group of devices can be associated with a group address that is unique to a particular zone. The zone can also be configured according to other schemes, e.g., bindings, address masks, etc. The example zones including pairings of a single wireless switch or sensor to a single wireless lighting device or plug control (e.g., zone 92), groupings of wireless switches and/or sensors with wireless lighting controls and plug controls (e.g., zones 94, 96 and 98). The task of ensuring that wireless devices are on the correct wireless network segment and ensuring that device zones are properly assigned, even for a relatively modest number of adapters and switches, can become complex and labor intensive. Manual methods of sequentially identifying each device, and then assigning them to a zone, exist but are extremely time consuming and labor intensive.

SUMMARY

This specification describes technologies relating to wireless system commissioning and optimization. In general, one innovative aspect of the subject matter described in this specification can be embodied in methods that include the actions of accessing zone configuration data specifying a plurality of zones in a wireless network and further specifying, for each zone, one or more wireless devices of a plurality of wireless devices that belong to the zone; in response to a first physical stimulus in an area, receiving sensor data from a first sensor device that can sense the first physical stimulus in the area and generate the sensor data in response to sensing the first physical stimulus, the first sensor device not belonging to a zone and the area being an area in which are located other wireless devices belonging to a first zone as specified by the zone configuration data; generating a commissioning event for the first zone; and in response to the sensor data and the commissioning event, updating the zone configuration data so that the zone configuration data specifies that the first sensor device belongs to the first zone. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing zone configuration data specifying a plurality of zones in a wireless network and further specifying, for each zone, one or more wireless devices of a plurality of wireless devices that belong to the zone; in response to a physical stimulus in an area, receiving first sensor data from a first sensor device that can sense the physical stimulus in the area and generate the first sensor data in response to sensing the physical stimulus, the first sensor device not belonging to a zone and the area being an area in which are located other devices belonging to a first zone as specified by the zone configuration data; determining if second sensor data from a second sensor device that can sense the physical stimulus is received; in response to determining that the second sensor data from a second sensor device is not received, updating the zone configuration data so that the zone configuration data specifies that the first sensor device belongs to the first zone. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing zone configuration data specifying a plurality of zones in a wireless network and further specifying, for each zone, one or more wireless devices of a plurality of wireless devices that belong to the zone; monitoring the joining of a first wireless device to the wireless network; in response to the monitoring: instructing the first wireless device to generate a physically perceptible identification signal that identifies the first sensor device; monitoring for a zone confirmation signal for each of the plurality of zones; in response to the monitoring of a zone confirmation signal for a first zone in the plurality of zones, updating the zone configuration data so that the zone configuration data specifies that the first wireless device belongs to the first zone. Other embodiments of this aspect include corresponding systems, apparatus, and computer programs, configured to perform the actions of the methods, encoded on computer storage devices.

Another innovative aspect of the subject matter described in this specification can be embodied in methods that include the actions of monitoring the joining of a wireless photo sensor devices to a wireless network and the joining of wireless lighting devices to the network and that do not belong to a zone, and in response to the monitoring of the joining of wireless photo sensor devices and the joining of wireless lighting devices to the network: selecting the wireless photosensors; selecting the wireless lighting devices; assigning the wireless photo sensors and wireless lighting devices to respective zones, each respective zone based on respective couplings between the wireless photo sensors and the wireless lighting devices. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The commissioning process can sense physical stimuli that accompanies normal commissioning (e.g., light adjustments or installer movement) and use this information to expedite commissioning. Wireless devices can be commissioned with limited or no user intervention, thereby decreasing installation costs. A robust confirmation process can ensure proper commissioning for multiple devices and multiple zones even in fully deployed and operational wireless network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1A:
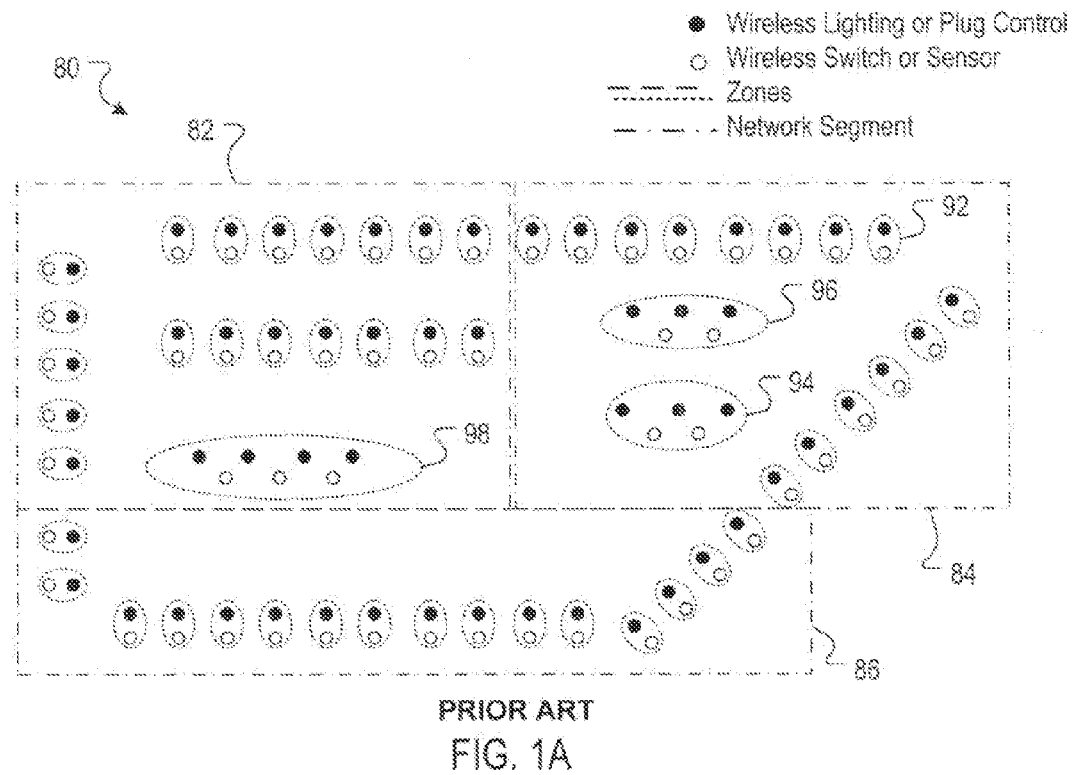
FIG. 1A is a block diagram illustration of zone configurations for devices.
Figure 1B:
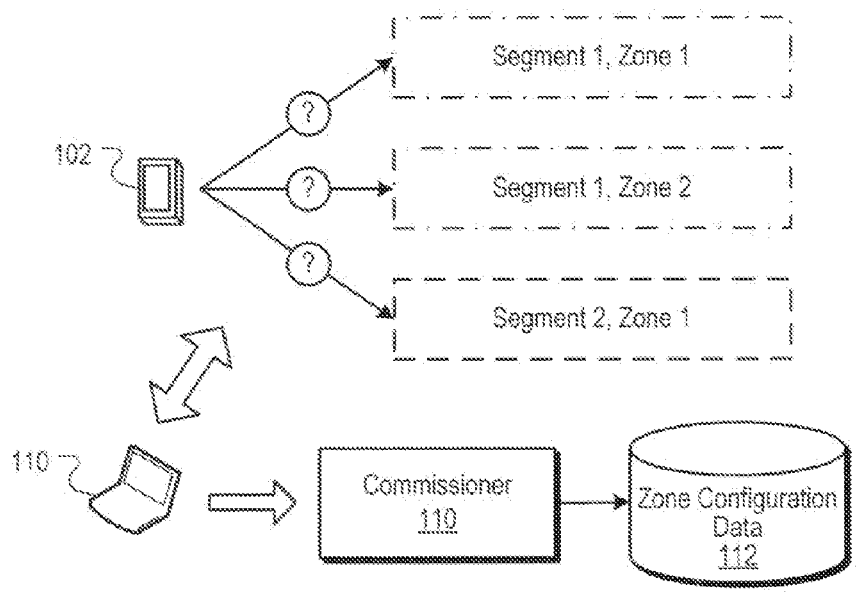
FIG. 1B is a block diagram of a wireless device that can be joined to different network segments and assigned different zones.

FIG. 1B is a block diagram of a wireless device 102 that can be joined to different network segments and assigned different zones. For the purposes of illustration only, the wireless devices may conform to the ZigBee specification, which is based on the IEEE 802.15.4 standard. The IEEE 802.15.4 standard is a standard for low-rate wireless personal area networks (LR-WPANs). The ZigBee specification defines a suite of high level communication protocols that use low-power and low-bandwidth digital radios. The low power consumption and low bandwidth requirements of a ZigBee device reduces cost and prolongs battery life, and thus such devices are often used for sensors, monitors and controls. Other devices that communicate according to other wireless protocols can also be used, and thus the devices and processes described below can be applied to other types of wireless networks as well.

The wireless device can be a sensor that senses a physical stimulus. A physical stimulus is a stimulus in an environment that is either indicative of a person's presence or indicative of an environmental change in the environment. For example, the motion of a person is a physical stimulus that can be detected by an occupancy sensor; the body heat of a person can be detected by a thermal sensor; and illumination level can be detected by a photo sensor, etc. The wireless device can also be an other device that controls other wireless devices or wired devices (e.g., a wireless switch, a wireless lighting adapter, etc.). The wireless devices do not need to be entirely of wireless design, as long as it has a wireless communication capability; for example, a wireless ballast adapter may be connected to a main power supply (e.g., a 120V power line) and received commands from a battery operated wireless dimmer. Likewise, a wireless plug load may be connect to main power, and may be wirelessly controlled by another wireless device.

For example, in lighting control systems, there are two main types of sensors that are commonly used—occupancy (or motion) sensors and photo sensors. Motion sensors are typically used to turn lights on and off. Photo sensors are typically used for daylighting, a process by which a natural daylight coming through windows, atriums or similar transparent building material is measured and electric light from lighting devices are reduced in order to conserve electricity in such areas when the measurements indicate sufficient illumination.

As will be described in more detail below, a commissioner 110 can use the sensor data and correlate the sensor data with commissioning events to enable automated self-commissioning. In particular, the sensor data is generated in response to the sensor sensing a physical stimulus (e.g., movement or an illumination level change) so that the sensor can be correctly assigned to a particular zone on a particular network segment.

Assume that the wireless device 102 is a wireless sensor that is being joined to a wireless lighting control system. When the sensor is first powered, it will attempt to join a network. Assume that the sensor is supposed to be joined to segment 1, zone 2. On its own, the sensor may join any of the two segments. Furthermore, once on a network segment, the sensor is to be assigned to a zone.

The commissioner 110 ensures that the wireless device joins the proper network segment and zone. In particular, the commissioner 110 has access to zone configuration data 112 specifying zones in a wireless network and further specifying, for each zone, the wireless devices that belong to the zone.

Using the zone configuration data and sensor data form the sensor 102, the commissioner 110 can ensure that the sensor 102 joins the correct segment and is assigned to the correct zone.

Figure 2:
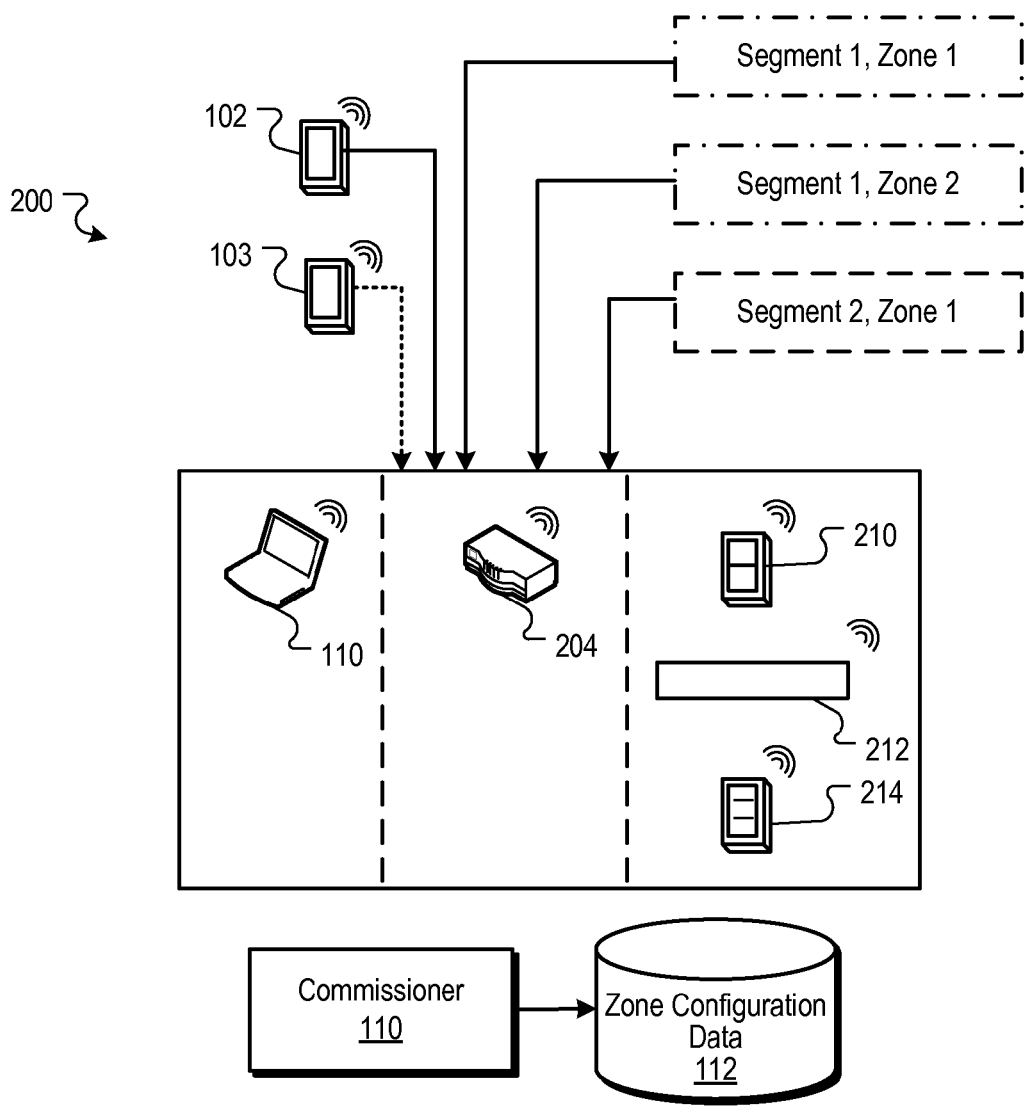
FIG. 2 is a block diagram illustration of wireless devices used in a commissioning process.

FIG. 2 is a block diagram illustration 200 of wireless devices use in a commissioning process. The devices include the commissioner 110, a controller 204, a wireless wall switch 210, a wireless ballast 212, and other wireless devices, such as a plug controller 214.

The wireless wall switch 210 is a wireless device already associated with a particular zone and a particular segment. The wireless ballast 214 may also be associated with a particular zone and a particular segment. The wall switch 212 and the ballast 214 could already have previously been commissioned onto that zone, for example. The wall switch 212 may have some interface (such as button(s) and/or LEDs) to allow human stimulus and/or feedback.

The controller 204 is a wireless device that wirelessly communicates with the sensor as well as any other device(s) in a zone or segment. In some implementations, the controller 204 can function as a gateway. Although the commissioner is described as being implemented on a mobile device, such as a laptop, the commissioner 110 can also be implemented in the controller 204, or other wireless devices, such as the wall switch 210 or with in the wireless ballast 212. Thus, the controller or the other wireless devices can also implement software algorithms that automate the commissioning process The commissioner 110 is a device brought in or used for the purpose of commissioning, and is capable of wirelessly communicating to the sensor as well as any other device(s) in a zone or segment. The commissioner 110 implements software algorithms that automate the commissioning process. The commissioner, when implemented in a portable device, provides portable interface that can be brought to specific rooms and locations by the installer as part of the commissioning process. Alternatively, the laptop can communicate with the controller 204 wirelessly when the controller implements the commissioner 110, thereby providing a portable interface.

§2.0 Automated Commissioning

The commissioner 110 is used to automatically commission environmental sensors, such as motion sensors, photo sensors, and the like, and assign them to the correct zones. The commissioner 110 does so by leveraging off pre-existing zone configurations if zone configuration data is available, e.g., zones that have already been established as part of a partially deployed system (such as in the case of an initial building installation) or in a fully deployed system (such as in the case of adding or replacing wireless devices in an operational system). The commission can also be used to automatically commission other wireless devices, such as lighting ballasts, plug controls, switches, and the like, and assign them to the correct zones.

Figure 3:
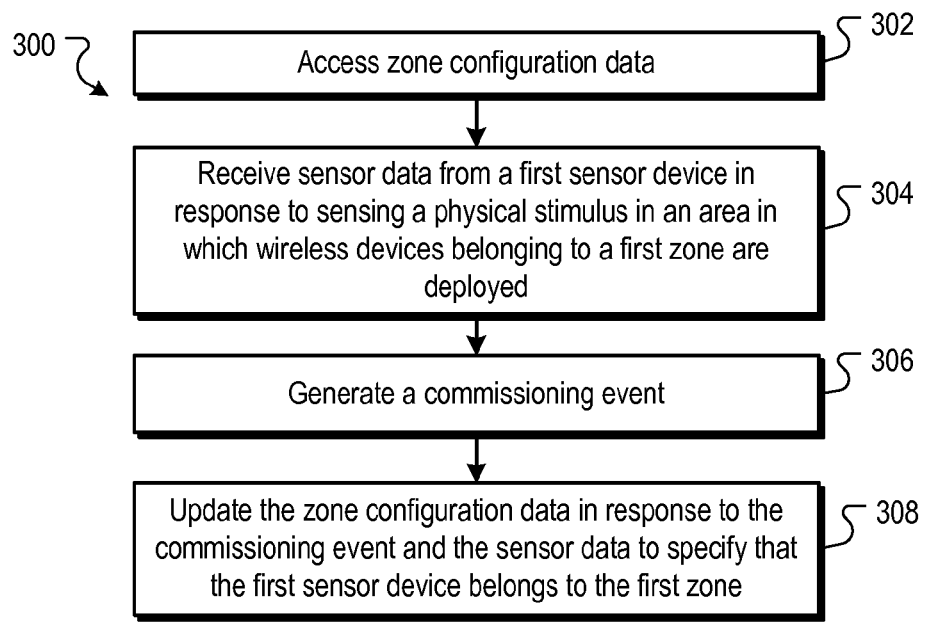
FIG. 3 is a flow diagram of an example automated commissioning process for a sensor.

FIG. 3 is a flow diagram of an example automated commissioning process 300 for a sensor. The process 300 can be implemented in software on a data processing apparatus, such as computer device implementing the commissioner 110. The process can be used to commission sensor devices in wireless networks, and is described with reference to motion sensors. The process 300 also applies to other sensor types, however.

§2.1 Automated Commissioning of Occupancy Sensors

Single Sensor Detection

In operation, the commissioner 110 accesses zone configuration data 112 specifying the zones in a wireless network and further specifying, for each zone, the wireless devices that belong to each zone (302 in FIG. 3). When installing wireless occupancy (e.g., motion) sensors, an installer technician goes through each area or room where the motion sensors are to be installed. When a sensor 102 is powered, it may join a commissioning network or join an existing segment, depending on the wireless protocol being used. In either case, the controller 204 can receive data from the sensor 102, even though the sensor 102 does not belong to a particular zone (304 in FIG. 3). For the purposes of this example, assume that the sensor 102 joins the correct network segment.

The installer will typically select an area in which are located other wireless devices belonging to a first zone as specified by the zone configuration data 112. For example, the installer may be installing a motion sensor in an office or meeting room in which switches and lighting ballasts have already been commissioned and zoned. In response to a first physical stimulus in an area, such as the installer moving in the area, the commissioner receives sensor data from the motion sensor 102.

The commissioner 110 then generates a commissioning event for the zone (306 in FIG. 3). For example, the installer can press a button (or some other form of stimulus) on the switch 210, which generates data that causes the commissioner to associate the commissioning event with the zone to which the switch 210 belongs. Alternatively, the installer can press a button (or some other form of stimulus) on a user interface of the commissioner 110 that associates a particular zone from a list of available zones displayed on the user interface of the commissioner 110 with the commissioning event.

The commissioner 110, in response to the sensor data and the commissioning event, updates the zone configuration data 112 so that the zone configuration data specifies that the sensor device 102 belongs to the first zone (308 in FIG. 3). In particular, the commissioner 110, receives the sensor data describing detection of occupancy, the commissioning event and the zone associated with the commissioning event. The commissioner 110 correlates these and can therefore associate the sensor 102 with the zone and assign the sensor 102 to that zone.

In some implementations, the commissioner 110 can require confirmation of the assigning of a sensor to the zone. For example, the commissioner 110 generates a confirmation request in response to updating the zone configuration data. The confirmation request identifies the first sensor device and the first zone, and the commissioner will only persist the update to the zone configuration data only in response to a confirmation responsive to the confirmation request. The confirmation can be used to ensure that the sensor is assigned to the correct zone.

For example, the commissioner 110 can instruct the sensor 102, after being detected and correlated to a zone, to generate physically perceptible identification signal that identifies the sensor to the installer. A physically perceptible identification signal is a signal that an installer can either see, hear, or both. The commissioner 110 also facilities the identification of the first zone by the installer, either by allowing the installer to again press a button (either a special purpose button associated with a zone assignment function, or, in some implementations, any button or input actuation that causes data to be generated by the device that belongs to the zone), or by identifying the first zone in a graphical user interface on a user device that is implementing the commissioner 110.

The installer then proceeds to the next area/room where the next occupancy sensor is located.

In some implementations, the wireless devices (sensors, controllers, etc.) can be further configured to provide physically perceptible device status signals that convey the state of commissioning. For example, the devices can have multiple light emitting diodes (LED) that light according to states, or vary the flashing rate or beeping rate of an LED or audio signal. Example states can include a "not joined or left a segment" state, a "not yet commissioned" state, a "commissioned" state, and a "commissioned and awaiting confirmation" state. Other states can also be added. The states that are conveyed allow the installer to quickly ascertain which wireless devices still need to be commissioned or confirmed.

On completion of the installation process (e.g., the installer has gone through every area and room where there is a wireless device to commission), any device that has not been allocated to a zone for that wireless segment is likely to not belong to the wireless segment being commissioned. As a result, the commissioner 110 can, in some implementations, instruct all such uncommissioned devices to leave the wireless segment.

The above example assumed the wireless device 102 joined the correct segment for commissioning. In the event that no sensor data is received by the commissioner 110, it is likely that the device 102 joined a different segment, or that the device may not be functioning properly. If the former, the commissioner 110 can access a gateway (e.g., controller 204) to communicate with the other segment on which the device 102 joined, and instruct the device 102 to join the correct segment. If the latter, the installer can replace or repair the device 102.

§2.2 Automated Commissioning of Occupancy Sensors

Multiple Sensor Detection

Figure 4:
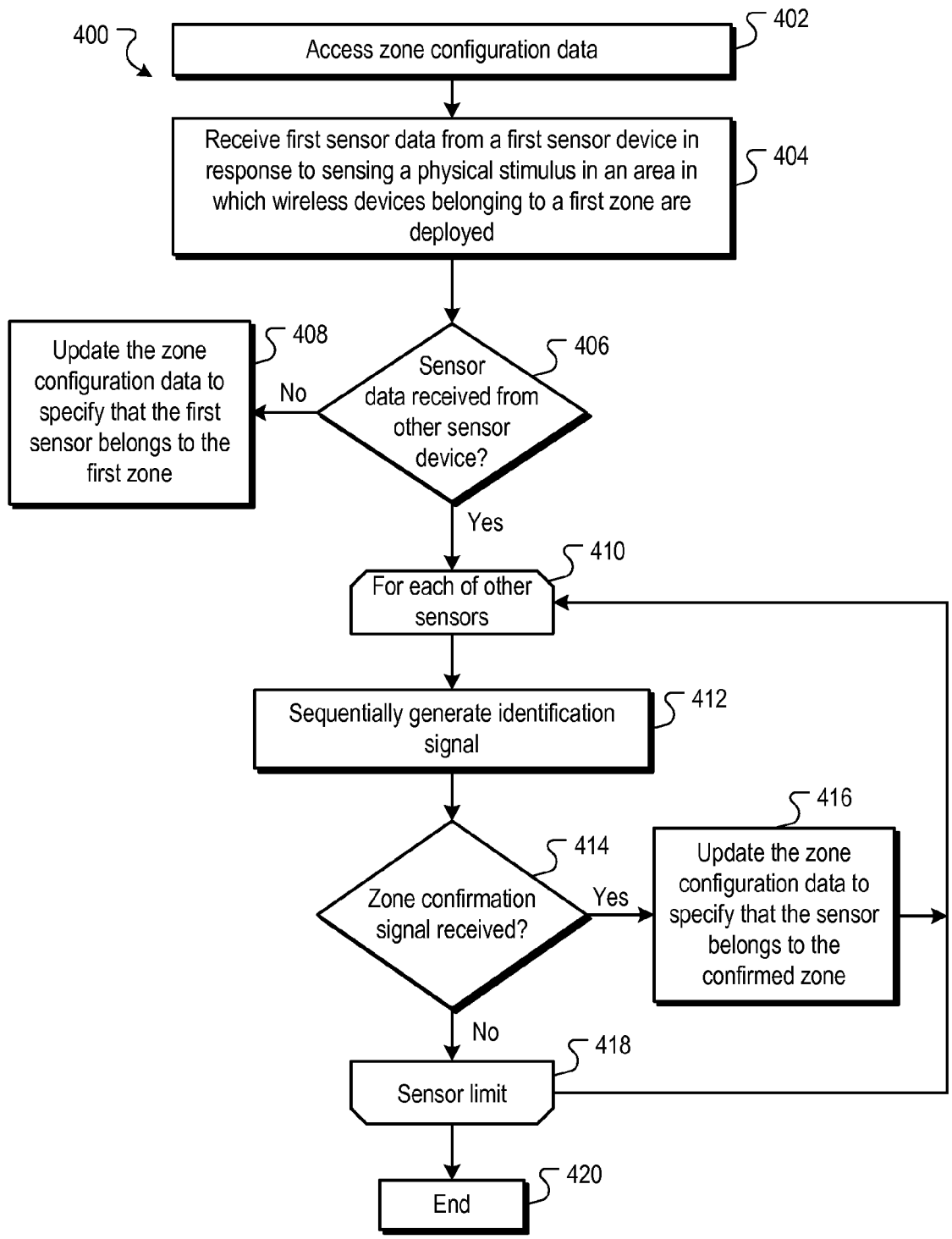
FIG. 4 is a flow diagram of another example automated commissioning process.

In the event that more than one sensor detects motion close enough to each other in time to prevent reliable determination by the commissioner 110 of which occupancy sensor to correlate to the commissioning event, an extension to the procedure describe above can be taken to correlate the sensor 102 to the commissioning event. FIG. 4 is a flow diagram of another example automated commissioning process 400 that is used to resolve commissioning ambiguities resulting form multiples sensors detecting a stimulus. The process 400 can be implemented in software on a data processing apparatus, such as computer device implementing the commissioner 110. The process can be used to commission sensor devices in wireless networks when multiple sensors, and is described with reference to FIG. 2 as well.

As before, the commissioner 110 accesses zone configuration data (402 in FIG. 4) and receives sensor data from the sensor 102 (404 in FIG. 4). The commissioner 110 can determine whether sensor data from a second sensor device 103 that can sense the physical stimulus is received, e.g., within a predetermined period of time from receiving the sensor data from the sensor 102 (406 in FIG. 4). If no data is received from the second sensor 103, the commissioner 110 can reliably update the zone configuration data 112 so that the zone configuration data specifies that the sensor 102 belongs to the first zone (408 in FIG. 4).

However, if sensor data for the sensor 103 is received, there may exist an ambiguity in zone assignments and a resolution may be required. For example, when the installer is installing a sensor, the commissioner may receive data from two sensors that detect the installer's movement, and that do not belong to any zone. A floor plan may specify that the two sensors belong to the same zone (e.g., to motion sensors in a large room) or may specify that the two sensors belong to different zones (e.g., motion sensors in separate offices).

When this occurs, the controller 110 can instruct the sensors 102 and 103 to sequentially generate physically perceptible identification signals (412 and loop limits 410 and 418 in FIG. 4). The signals are generated sequentially so that only one sensor device is identified at any one time.

The installer may then confirm a zone assignment in a similar manner as described above (e.g., pressing a button on switch 210, selecting the desired zone on the commissioner 110, or potentially a different button on the sensor or a device belonging to a particular zone). In the presence of two or more sensors 102 and 103, the confirmation generates a zone confirmation signal for the zone (414 in FIG. 4). Thus, in response to receiving a zone confirmation signal after a sequential generation of the physically perceptible identification signal, the zone configuration data 112 are updated so that the zone configuration data 112 specifies that the sensor device that most recently generated the physically perceptible identification signal belongs to the confirmed zone (416 in FIG. 4).

After all the sensors have been processed, the installation is complete (420).

The sequential generation can also be extended if a sensor is to be paired to two or more zones. For example, a conference room may have separate zones for accent lighting, projector lighting, and main room lighting, and two motion sensors at each end of the room may be included in each of the zones. Accordingly, the commissioner 110 can, for each detected device, further sequentially cycle through each zone for a zone confirmation for that device. Thus, for N detected devices in a segment with M zones, up to N*M zone confirmations are possible.

2.3 Automated Commissioning of Photo Sensors

While the steps and procedures described above apply to the use of motion detected by a motion sensor to commission the sensor onto the correct zone, a similar process can also be used to commission other sensors, such as photo sensors. For example, when a photo sensor joins a network, the commissioner 110 can cycle through each zone and cause the lighting in each zone to adjust a predefined amount (e.g., from full intensity to half intensity, from off to full intensity, etc.). This physical stimulus can be detected by the photo sensor and reported to the commissioner 110. The commissioner 110 can then determine from the sensor data whether the sensor senses a change in the illumination level of an area that is substantially proportional to the changing of the illumination level of the wireless lighting devices. In response to determining that the sensor senses a change in the illumination level of the area that is substantially proportional to the changing of the illumination level of the wireless lighting devices, the commissioner 110 can generate the commissioning event for that zone (e.g., can update the zone configuration data 112 to specify that the sensor belongs to the zone in which the lights were adjusted).

The procedures described here leverage the light level data collected by the photocell sensor to simplify and/or automate commissioning. This will be referred to as light level correlation.

In some implementations, a minimum sensed threshold may be specified to ensure that zones with light sources that have a limited impact on the sensor are not incorrectly associated with the sensor. For example, the photo sensor may be a hallway lighting sensor, and a conference room lighting may spill over into the hallway. The correlator 110 can require that the sensor detect at least a minimum 20% change in lighting before the sensor can be associated with a currently selected zone. This threshold can be used instead of, or in addition to, the proportional change requirement described above.

As described above, light spillover from devices in two adjacent zones associated with two different sets of lights may affect the light level detected by a particular sensor. In situations in which the desired outcome is to ensure that the photo sensor is assigned to one and only one zone, the commissioner 110 can cycle through all zones, and turn all lights in each zone on (or off), and assign the sensor to the zone that has the greatest influence on the sensor in terms of changes to the light level detected by that sensor. In some implementations, the commissioner 110 can set lighting levels in all zones to a known state (e.g., off), and then cycle through each zone, and, for each selected zone, turn the lights fully on and then fully off, and record the sensor reading. At the end of the process, the zone for which the lighting change resulted in the largest detected change in the sensor can be associated with the sensor.

In situations in which the desired outcome is to allow the sensor to be assigned to more than one zone, a threshold could be used by the commissioner 100 for each zone. Examples of such thresholds include a percentage change in light level or change in a specific number of foot-candles from turning lights completely off to on, or some other combination of percentage, foot-candles and source light change. The threshold is compared to the sensor data received for each zone to then determine which zones have lights that have an influence on the sensor that exceeds the threshold. The commissioner 110 then assigns the sensor to each the zones having lights that have an influence on the sensor that exceeds the threshold. The level by which the light level exceeds that threshold could also be used as a weight to determine how much influence lights from those zones have on the sensor.

For sensors that have both motion and photo sensor capability, one or both of the commissioning and zone assignment processes described above can be used. As with the motions sensors, on completion of the installation process (e.g., the installer has gone through every area and room where there is a wireless device to commission), any photo sensor device that has not been allocated to a zone for that wireless segment is likely to not belong to the wireless segment being commissioned. As a result, the commissioner 110 can, in some implementations, instruct all such uncommissioned devices to leave the wireless segment.

2.4 Automated Commissioning of Other Wireless Devices

Once sensors are commissioned and joined to their proper zones, the wireless devices and sensors belonging to any particular zone can be used to facilitate further commissioning of other wireless devices that belong to that zone. These other wireless devices include switches, ballasts, plug loads, etc., that are being added during initial deployment or replaced in a fully deployed and operational system. An illustrative example of the above process is the commissioning wireless plug loads. Wireless plug loads are devices that allow wireless control of appliances and electronic equipment that are plugged into main power. Such a device could be integrated into a power strip, or be a separate device that sits between the power plug from the appliance/equipment and the wall socket. These devices can be turned on or off wirelessly when, for example, an area is unoccupied, as determined by a motion sensor.

Wireless plug loads must then be commissioned to ensure that they are in the correct zone. For example, a plug load should be assigned to the same zone as an occupancy sensor that senses motion in the area that the wireless plug load is deployed. Commissioning can be achieved by leveraging occupancy correlation. When a wireless plug load is first plugged in and powered, it will attempt to join a wireless network segment. If the wireless plug loads are installed after hours, where there are few people in the office or work area, then it is likely that only the occupancy sensor where the installer has installed the wireless plug load will detect the motion of the installer, in which case the correlation between the zone which the occupancy sensor is a member of and the recently introduced wireless plug load can be made.

Conversely, if many other motion sensors detect motion, then the cycling sequence described above can be used to associate the plug zone with the proper zone. Should no occupancy sensor detect motion, or no confirmation action is successful, the commissioner 110 may then conclude that the wireless plug load is on the incorrect wireless segment and instruct it to leave the segment. This method can be used for any wireless device where there is a need to associate it with a zone which a wireless occupancy sensor is a member of.

Similarly, if a wireless plug load has a built-in photo sensor, commissioning can be achieved by leveraging light level correlation. When a wireless plug load is first plugged in and powered, it will attempt to join a wireless network segment. By varying the illumination in each zone, the wireless plug load can also be determined to be a member of a zone by examining the light level data generated by the photo sensor in the same way described earlier.

Figure 5:
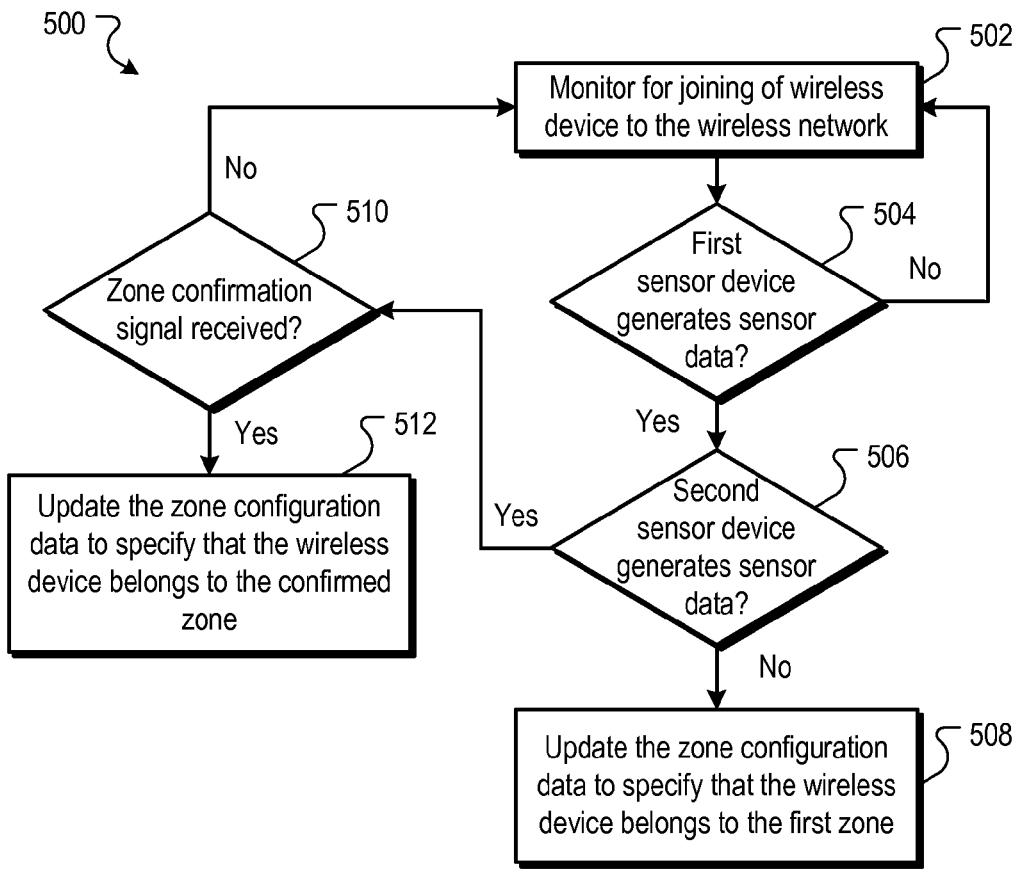
FIG. 5 is a flow diagram of an example automated commission process for a wireless device.

FIG. 5 is a flow diagram of an example automated commission process 500 for a wireless device. The process 500 can be implemented in software on a data processing apparatus, such as computer device implementing the commissioner 110.

In operation, the commissioner 110 can monitor for the joining of a wireless device to the wireless network (502), and in response to monitoring the joining of a wireless device, determine if the sensor device belonging to a particular zone generates sensor data in response to sensing a physical stimulus within a first predetermined time period measured from the monitoring of the joining event (504). For example, an installer may install a wirelessly controlled lamp or plug load, which then joins the network.

In response to these conditions being met, the commissioner 110 determines if sensors in other zones also sense a physical stimulus (e.g., movement) (506). For example, if the installer is installing devices after normal working hours, it is likely that the installer is the only person on a floor, and thus only one zone may detect movement—the zone to which the device being installed should be joined. If no other sensors belonging to the other zones generate sensor data in response to the physical stimulus within the predetermined time period measured from the monitoring of the joining event, the commissioner 110 updates the zone configuration data so that the zone configuration data specifies that the wireless device belongs the first zone (508).

Conversely, if other sensors detect a stimulus, the commissioner 110 can monitor for a zone confirmation signal for each of the zones for which sensors detected a stimulus (510). The zone confirmation signal is a signal that confirms a particular zone is to be associated with a joining device, and can be implicit or explicit. An implicit zone confirmation signal can be any signal generated by a device belonging to a zone within the predetermined time period. For example, the installer may actuate a wireless light switch or a wireless thermostat belonging to the zone. An explicit zone confirmation signal can be a signal (or series of signals) generated by a device belonging to a zone within the predetermined time period and which is specified as a zone confirmation signal. For example, the installer may actuate a light switch several times in rapid succession according to a zone confirmation signal pattern—e.g., ON/OFF/ON/OFF/ON/OFF. Alternatively, a dedicate zone confirmation button or combination of buttons may be actuated to generate the zone confirmation signal. Finally, the installer may also select the zone from the graphic user interface of the commissioner 110.

In response to the monitoring of a zone confirmation signal the commissioner 110 updates the zone configuration data so that the zone configuration data for the zone for which the zone confirmation signal was received specifies that the recently joined wireless device belongs to the zone (512).

If no zone confirmation signal is received, or if no sensor data is received in response to monitoring the joining of a wireless device to the network, then the process returns to monitoring for the joining of a wireless device to the network (502).

§2.5 Automated Commissioning of Devices by Device Cycling

Figure 6:
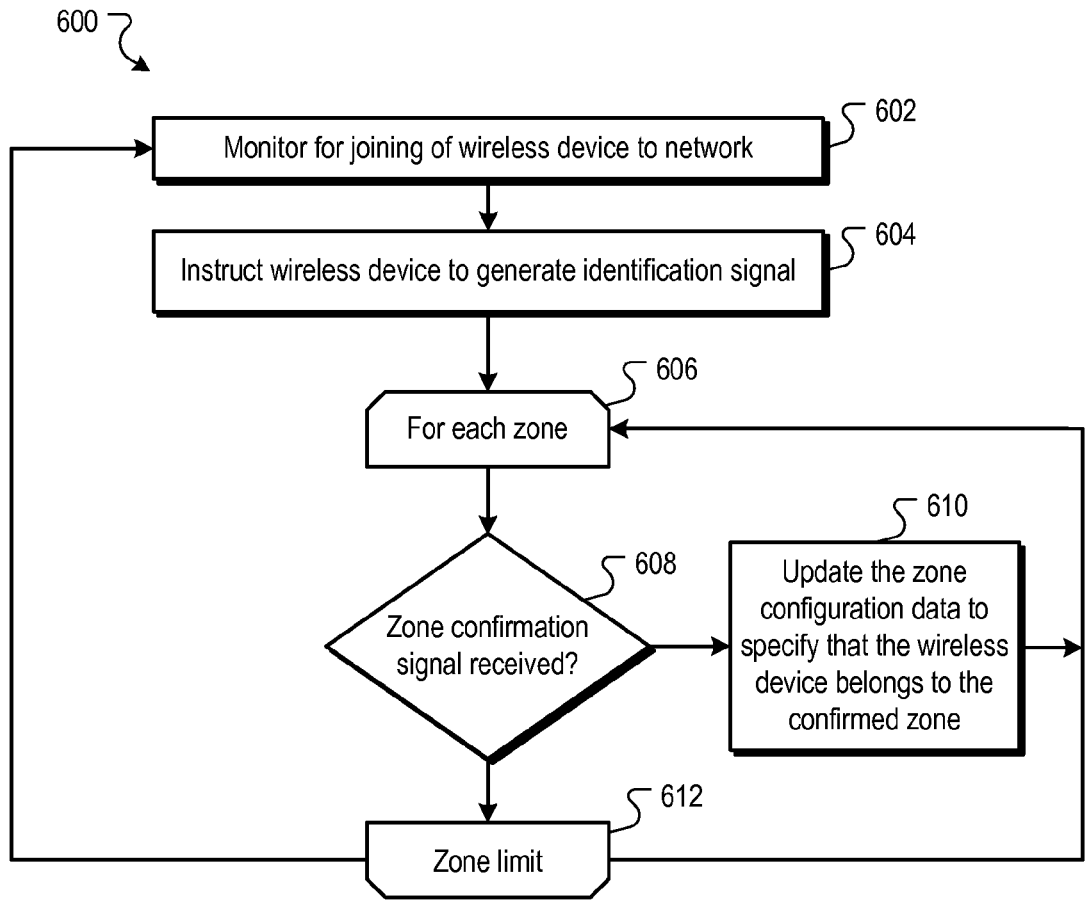
FIG. 6 is a flow diagram of another example automated commissioning process.

FIG. 6 is a flow diagram of another example automated commissioning process 600. The process 600 can be implemented in software on a data processing apparatus, such as computer device implementing the commissioner 110.

In some implementations, the commissioner 110 can provide automated commission of wireless devices capable of providing some visual or audible feedback to identify themselves. The commissioner 110 can cycle through all devices, and for each device instruct the device to identify itself using the visual or audible signal. The installer then takes action to confirm that the device is in a particular zone when the device identifies itself.

In operation, commissioner 110 accesses the zone configuration data 112, and monitors for the joining of a wireless device to the wireless network (602). In response to monitoring the joining of a wireless device, the commissioner 110 instructs the wireless device to generate a physically perceptible identification signal that identifies the wireless device (604), and then monitors for a zone confirmation signal for each of the zones (608 and loop limits 606 and 612). In response to the monitoring of a zone confirmation signal for a particular zone, the commissioner updates the zone configuration data so that the zone configuration data specifies that the wireless device belongs to the particular zone (610).

The process 600 is illustrated for one wireless device, but can be extended to multiple wireless devices. Thus, for N detected devices in a segment with M zones, up to N*M zone confirmations are possible.

§2.6 Automated Commissioning of Photo Sensors and Lighting Devices

In some implementations, the commissioner 110 is configured to assign wireless photo sensors and wireless lighting devices (e.g., wireless ballasts, wireless LED lighting drivers, incandescent dimmers, or other wireless lighting devices) that do not belong to zones to corresponding zones in a completely automated processes. In these implementations, no prior zone configuration data is necessary, and therefore the processes can be implemented independent of pre-existing zone configuration data.

Figure 7:
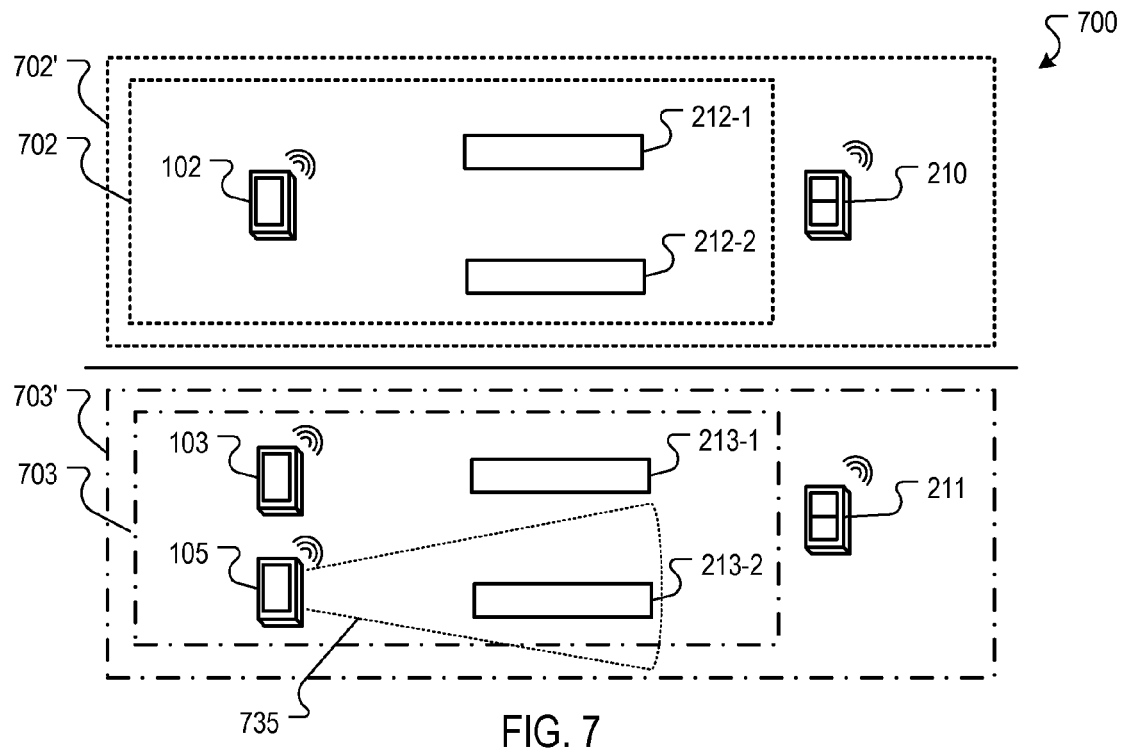
FIG. 7 is a block diagram of wireless photo sensors and wireless lighting devices that have joined a network.

FIG. 7 is a block diagram 700 of wireless photo sensors 102, 103 and 105 and wireless lighting devices 212-1, 212-2, 213-1 and 213-2 that have joined a network. The diagram is representative of lighting for two separate rooms, as indicated by the line between the groups of devices. Alternatively the diagram is representative of separate sub-areas within a larger area, such as a warehouse storage area. For illustrative purposes only, however, the example is described in the context of separate rooms.

Figure 8:
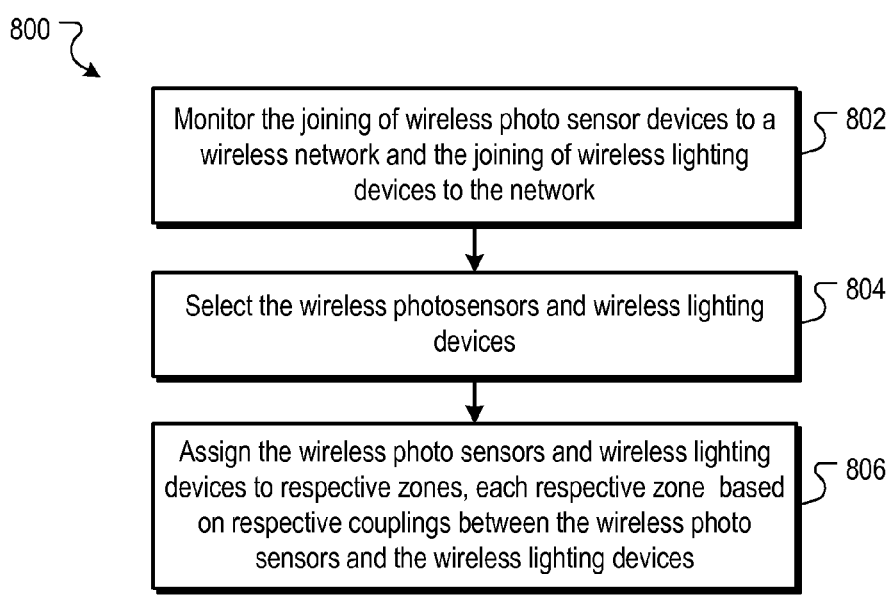
FIG. 8 is a flow diagram of an example process of assigning wireless lighting devices and wireless photo sensors to zones.

In each room there may be located a wireless switch (switches 210 and 211) for controlling the wireless lighting devices 212 and 213. Assume that all devices have joined the network but are not assigned to any zones, and assume that the desired zone configuration is to have the wireless devices in each room on separate and independent zones, e.g., zones 702' and 703'. The zoning can be achieved by the example process 800 of FIG. 8. FIG. 8 is a flow diagram of the example process 800 of assigning wireless lighting devices and wireless photo sensors to zones.

In operation, the commissioner 110 monitors the joining of wireless photo sensor devices to a wireless network and the joining of wireless lighting devices to the network (802). The wireless devices 102, 103, 105, 212 and 213 do not belong to any zones. In response to monitoring the joining, the commissioner 110 are monitored as joining the network, the commissioner 110 selects the wireless photo sensors and the wireless lighting devices (804) and assigns the wireless photo sensors and wireless lighting devices to respective zones 702' and 703', each respective zone based on respective couplings between the wireless photo sensors and the wireless lighting devices (806). For example, the commissioner 110 can determine that the wireless lighting devices 212 and the wireless photo sensor 102 are coupled by illumination, and create a new zone 702' and assigned the wireless lighting devices 212 and the wireless photo sensor 102. A similar zone 703' is created for the wireless lighting devices 213 and the wireless photo sensor 103.

In some implementations, the commissioner 110 assigns the wireless photo sensors and wireless lighting devices to respective zones as follows. The commissioner 110 sequentially instructs the wireless lighting devices 212-1, 212-2, 212-3 and 212-4 that joined the network to change an illumination level so that only one wireless lighting device that joined the network changes an illumination level at any one time. For example, all lighting devices 212 and 213 may be turned off, and then lighting device 212-1 is selected and instructed to turn on to a predefined level (e.g., fully illuminated, or some portion thereof).

The commissioner 110 then receives photo sensor data from the wireless photo sensors 102, 103 and 105. For example, the commissioner 110 receives sensor data form the photo sensor 102 indicating a change in light level proportional to the illumination change generated by the wireless lighting device 212-1, and receives sensor data from the photo sensors 103 and 105 indicating very little change, or no change) in light level proportional to the illumination change generated by the wireless lighting device 212-1.

The commissioner 110 determines, for each wireless photo sensor from the photo sensor data for the wireless photo sensor, if the photo sensor senses a change in the illumination level that is substantially proportional to the changing of the illumination level of the wireless lighting device. Here, the commissioner 110 would determine the photo sensor 102 senses a change in the illumination level that is substantially proportional to the changing of the illumination level of the wireless lighting device 212-1.

In response to determining that the photo sensor 102 senses a change in the illumination level that is substantially proportional to the changing of the illumination level of the wireless lighting device 212-1, the commissioner 110 assigns the photo sensor and the wireless lighting device to a zone, e.g., zone 702, and then updates the zone configuration data 112 to indicate that the devices 102 and 212-1 belong to zone 702.

As none of the devices 102, 103, 105, 212 and 213 initially belong to any zones, the commissioner 110 can generate new zones if needed. In some implementations, the commissioner 110 determines if either of the wireless photo sensor 102 or the wireless lighting device 212-1 have been assigned to a zone. Assume that neither the sensor 102 nor the wireless lighting device 212-1 are assigned to a zone (e.g., the wireless lighting device 212-1 is the first device selected for zone testing). In response, the commissioner generates a new zone—zone 702, and assigns the wireless photo sensor and wireless lighting device to the new zone.

The commissioner then selects the wireless lighting device 212-2. By the same process, the commissioner 110 will determine that the photo sensor 102 senses a change in the illumination level that is substantially proportional to the changing of the illumination level of the wireless lighting device 212-2, and that the photo sensor 103 does not detect the change. Accordingly, the commissioner 110 will determine if either of the wireless photo sensor 102 or the wireless lighting device 212-2 have been assigned to a zone. Here, the commissioner 110 determines that the sensor 102 is assigned to zone 702, and in response assigns the wireless lighting device 212-2 to the zone 702.

The process continues with wireless lighting devices 213-1 and 213-2. For these devices, a zone 703 is created. Note, however, that zone 703 has multiple sensors. For example, the commissioner may initially create the zone 703 with the photo sensor 103 and the wireless lighting device 213-1. Then when processing the data for the photo sensor 105, the commissioner 110 will determine that the wireless lighting device 213-1 has been assigned to the zone 703, and thus will assign the wireless photo sensor 105 to the same zone 703.

Some building plans may have only one lighting sensor for any particular zone. In such situations, the commissioner 110 can assign lighting devices and sensors that have the highest relative measures of illumination coupling to separate corresponding zones. For example, assume FIG. 7 depicts a device arrangement for an open warehouse floor, and that there is no wall between the wireless lighting devices. In this environment, each of the wireless lighting devices 212-2, 212-2, 213-1 and 213-2 may have an effect on each of sensors 102, 103 and 105. Table 1 illustrates one such example set of measurements of normalized illumination coupling.

TABLE 1

Normalized Illumination Coupling

| Lighting Device | Sensor 102 | Sensor 103 | Sensor 105 |
|---|---|---|---|
| 212-1 | 0.97 | 0.51 | 0.43 |
| 212-2 | 1.00 | 0.65 | 0.49 |
| 213-1 | 0.62 | 1.00 | 0.66 |
| 213-2 | 0.41 | 0.50 | 1.00 |

Given the constraint of one sensor per zone, the commissioner 110 determines which sensors are most highly coupled with lighting device, and assigns each of the devices to their respective sensors in a corresponding separate zone. In some implementations, the commissioner 110 cycles through each sensor and lighting device pair and assigns the most highly coupled sensor and lighting device pair to a particular zone. The assigned lighting device is then removed from consideration. After an initial set of assignments, the commissioner 110 cycles through the remaining lighting devices and again assigns the most highly coupled sensor and lighting device pair to the particular zone to which the sensor is assigned. For example, with respect to Table 1, the commissioner 110, after the first iteration, would assign the sensor 102 and lighting device 212-2 to a first zone, sensor 103 and lighting device 213-1 to a second zone, and sensor 105 and lighting device 213-2 to a third zone. The assigned lighting devices are thereafter removed from consideration, leaving lighting device 212-1. As lighting device 212-1 is most highly correlated to the sensor 102 (i.e., 0.97 normalized coupling for sensor 102, while only 0.51 and 0.43 normalized coupling for sensors 103 and 105, respectively), it is also assigned to the zone to which the sensor 102 is assigned—the first zone.

Accordingly, the commissioner 110 can readily facilitate the detection and proper zoning of wireless lighting devices and photo sensors to corresponding zones based on illumination coupling.

In some implementations, the commissioner 110 can further add additional wireless devices to these zones. For example, one the zones are generated, an installer may desire to add light switches 210 and 211 to respectively control the wireless lighting devices 212 and 213, respectively. Here, the commissioner can leverage of the zone configuration data 112 that it created for the zones 702 and 703. For example, the commissioner 110 can monitoring the joining of other wireless devices (e.g., the switches 210 and 211) to the wireless network, and in response to the monitoring of the joining of an other wireless device to the wireless network execute an iterative process for assigning the switches to the corresponding zones. For example, the commissioner 110 can sequentially select each zone 702 and 703 and instruct the wireless lighting devices belonging to the selected zone to change an illumination level so that only the wireless lighting devices of one zone change an illumination level at any one time. For example, the commissioner can select zone 702 and cause the wireless lighting devices 212 to flicker or change their illumination level for a predetermined period of time, e.g., 30 seconds. This serves as a visible signal to the installer that the zone 702 is eligible for confirmation.

The commissioner 110 then monitors for a for a zone confirmation signal for each the sequentially selected zones. For example, the installer may stand in the room corresponding to zone 702, and when the lights begin to change in illumination level, can actuate the switch 210 to generate a zone confirmation signal. The switch 210 may include a dedicated button for generating the zone confirmation signal, or the commissioner 110 may interpret a series of predefined cycles, e.g., ON/OFF/ON/OFF/ON, as the zone confirmation signal, or simply, by selecting ON or OFF and as the commissioner 110 is able to establish that the switch 210 is not a member of a zone, and that any physical stimulus during this confirmation process may suffice to indicate, that the installer wants to assign the switch 210 to the zone.

In response to the monitoring of a zone confirmation signal from the switch 210, the commissioner 110 updates the zone configuration data 112 so that the zone configuration data for the zone 702 for which the zone confirmation signal was received specifies that the wireless switch 210 belongs to the zone 702 (thereby specifying the updates zone 702'). The installer may then process to the next room corresponding to zone 703, and when the lights begin to change in illumination level, can actuate the switch 211 to generate a zone confirmation signal for zone 703.

Accordingly, by use of the commissioner 110, the installer merely needs to install the wireless lighting devices, switches and sensors. The zones will be emergent and the installer only awaits for each zone to identify itself, at which time the installer may actuate any other devices that need to be assigned to the particular zone to achieve the assignment.

Finally, in the event of significant illumination spillover, the installer can use the commissioning tool to partition (or group) any zones as necessary, should any granular zoning adjustments be needed or desired.

§2.7 Automated Commissioning of Occupancy Sensor without Pre-Existing Zone Configuration Data As described above, a zone may often have an occupancy sensor assigned as one of the wireless devices, and the motion of an installer can be used to automatically assign a sensor to a zone for which certain other devices have already been assigned.

Often sensor devices have multiple sensing capabilities. For example, some sensing devices can sense both motion and illumination levels. Furthermore, as describe above, it is possible to use illumination coupling to assign photo sensors to corresponding zones, even in the absence of pre-existing zone configuration data. In another implementation, a motion sensor that also has a photo sensing capability can be assigned to a corresponding zone using the zone assignment process of Section 2.6 described above. For example, a row of lights in a warehouse, or lights in an office, and a motion sensor can be assigned to the same zone using the illumination level coupling sensed by the illumination level of the photo sensor built into the motion sensor.

In some implementations, the motion sensor can be specially configured so that the photo sensor has approximately the same field of view as the motion sensor. For example, assume the sensor 105 of FIG. 7 is a motion sensor and photo sensor, and that the motion sensor has a 35 degree field of view 705. Accordingly, the photo sensor built into the motion sensor has the same 35 degree field of view 705 that coincides with the motion sensor field of view. The output of the photo sensor 105 is used specifically for the commissioning process, and thereafter can be optionally ignored during normal system operation. To conserve system bandwidth, the wireless photo sensor can be further configured to provide sensor only in response to a commissioning request from the commissioner 110.

2.8 Automated Commissioning of Plug Load with Pre-Existing Zone Configuration Data In some implementations, a user, by use of a user interface, is provided the capability to select a zone for joining devices. When the zone is selected, new devices are allowed to join the network and are automatically assigned to the zone. This function can be realized by allowing joining only when a particular zone is selected.

In an alternate implementation, activating a wireless wall switch, such as with a predefined key sequence, is used to automatically select the zone to which the wall switch is joined and allow new devices to join the network. These devices are then automatically assigned to the zone of the wall switch.

For example, plug loads installed in a space are required to join a network and a particular zone on that network. By use of the user interface or the switching pattern, the installer selects the particular zone, and the plug loads, once joined to the network and the zone, generate a confirmation signal, such as an LED illumination pattern. Thereafter, the installer can then move on to the next set of devices to configure.

§3.0 Additional Implementation Examples

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a personal digital assistant (PDA), a mobile audio or video player, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can optionally be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 9:
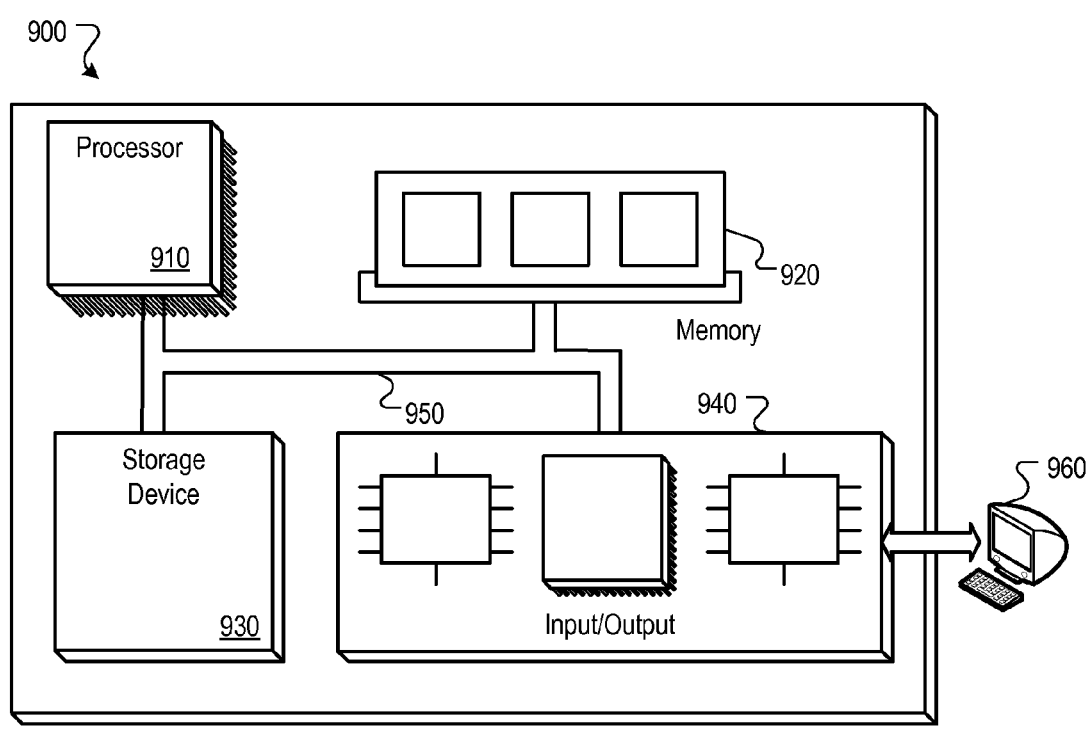
FIG. 9 is a block of a programmable processing system.

An example of a computer in which the above-described techniques can be implemented is shown in FIG. 9, which shows a block diagram of a programmable processing system (system). The system 900 can be utilized to implement the systems and methods described above.

The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a wired network interface device, a serial communication interface device, and/or a wireless interface device.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   accessing zone configuration data specifying a plurality of zones in a wireless network and further specifying, for each zone, one or more wireless devices of a plurality of wireless devices that belong to the zone;
   generating a first physical stimulus in an area by instructing wireless lighting devices belonging to a first zone to change an illumination level, the first physical stimulus being a change in an illumination level in the area;
   in response to the first physical stimulus, receiving sensor data from a photo sensor device that can sense the first physical stimulus in the area and generate the sensor data in response to sensing the first physical stimulus, the photo sensor device not belonging to a zone and the area being an area in which are located other wireless devices belonging to the first zone as specified by the zone configuration data;
   generating a commissioning event for the first zone including:
      determining, from the sensor data, if the photo sensor device senses a change in the illumination level of the area that is proportional to the changing of the illumination level of the wireless lighting devices; and
      in response to determining that the photo sensor device senses a change in the illumination level of the area that is proportional to the changing of the illumination level of the wireless lighting devices, then generating the commissioning event; and
   in response to the sensor data and the commissioning event, updating the zone configuration data so that the zone configuration data specifies that the photo sensor device belongs to the first zone.

2. The method of claim 1, further comprising:
   generating a confirmation request in response to updating the zone configuration data, the confirmation request identifying the photo sensor device and the first zone; and
   persisting the update to the zone configuration data only in response to receiving a confirmation responsive to the confirmation request.

3. The method of claim 2, wherein:
   generating a confirmation request in response to updating the zone configuration data comprises:
      generating a first physically perceptible identification signal that identifies the photo sensor device;
      facilitating the identification of the first zone by a user; and
      wherein receiving an identification of the first zone after the generation of the first physically perceptible identification signal constitutes a confirmation responsive to the confirmation request.

4. The method of claim 3, wherein the first physically perceptible identification signal that identifies the photo sensor device is an illumination of the photo sensor device.

5. The method of claim 3, wherein facilitating the identification of the first zone by the user comprises identifying the first zone in response to a user actuation of a device belonging to the first zone.

6. The method of claim 3, wherein facilitating the identification of the first zone by the user comprises identifying the first zone in a graphical user interface on a user device, the graphical user interface including a selectable user input, and confirming the identification of the zone in response to a selection of the selectable user input.

7. The method of claim 1, wherein the photo sensor device includes a motion sensor, and the first physical stimulus includes a motion of an object in the first area.

8. The method of claim 1, further comprising:
   monitoring the joining of a first wireless device to the wireless network;
   in response to the monitoring, determining if the photo sensor device generates sensor data in response to sensing a second physical stimulus in the area within a first predetermined time period measured from the monitoring of the joining event;
   in response to determining that the photo sensor device generates sensor data in response to sensing the second physical stimulus in the area within the first predetermined time period:
      determining if a second sensor device belonging to a second zone generates sensor data in response to a physical stimulus within the first predetermined time period measured from the monitoring of the joining event; and
      in response to determining that the second sensor device belonging to the second zone did not generate sensor data in response to the physical stimulus within the first predetermined time period measured from the monitoring of the joining event, updating the zone configuration data so that the zone configuration data specifies that the first wireless device belongs to the first zone.

9. The method of claim 8, in response to determining that the second sensor device belonging to the second zone did generate sensor data in response to the physical stimulus within the first predetermined time period measured from the monitoring of the joining event:
   monitoring for a zone confirmation signal for each of the first and second zones; and
   in response to the monitoring of a zone confirmation signal, updating the zone configuration data so that the zone configuration data for the zone for which the zone confirmation signal was received specifies that the first wireless device belongs to the zone.

10. The method of claim 9, wherein:
    monitoring for a zone confirmation signal comprises monitoring for a zone confirmation signal from second wireless devices belonging to the first zone and second wireless devices belonging to the second zone within a second predetermined time period; and
    updating the zone configuration data comprises updating the zone configuration data so that the zone configuration data specifies that the first wireless device belongs to the zone to which the second wireless device belongs.

11. A computer-implemented method comprising:
monitoring, by one or more data processors, the joining of wireless photo sensor devices to a wireless network and the joining of wireless lighting devices to the network and that do not belong to a zone, and in response to the monitoring of the joining of wireless photo sensor devices and the joining of wireless lighting devices to the network:
selecting, by the one or more data processors, the wireless photo sensor devices;
selecting, by the one or more data processors, the wireless lighting devices;
assigning, by the one or more data processors, the wireless photo sensor devices and wireless lighting devices to respective zones, each respective zone based on one or more couplings between one or more wireless photo sensor devices and the wireless lighting devices in the respective zone, wherein the assigning comprises:
sequentially instructing wireless lighting devices that joined the network to change an illumination level so that only one wireless lighting device that joined the network changes an illumination level at any one time;
receiving photo sensor data from the wireless photo sensor devices;
determining, for each wireless photo sensor device from the photo sensor data for the wireless photo sensor device, if the photo sensor device senses a change in the illumination level that is proportional to the changing of the illumination level of the wireless lighting device;
in response to determining that the photo sensor device senses a change in the illumination level that is proportional to the changing of the illumination level of the wireless lighting device, assigning the photo sensor device and the wireless lighting device to a zone; and
storing in a zone configuration data store zone configuration data specifying one or more zones to which the photo sensor devices and wireless lighting devices are assigned, the zone configuration data specifying, for each zone, wireless devices that belong to the zone.

12. The method of claim 11, wherein each of the assigning the photo sensor device and the wireless lighting device to a zone comprises:
determining if either of the wireless photo sensor device or the wireless lighting device have been assigned to a zone;
in response to determining that the wireless photo sensor device has been assigned to a particular zone, assigning the wireless lighting device to the same zone; and
in response to determining that neither of the wireless photo sensor device nor the wireless lighting device have been assigned to a particular zone, generating a new zone and assigning the wireless photo sensor device and wireless lighting device to the new zone.

13. The method of claim 12, further comprising in response to determining that the wireless lighting device has been assigned to a particular zone, assigning the wireless photo sensor device to the same zone.

14. The method of claim 11, wherein:
at least one of the wireless photo sensor devices includes a motion sensor, and wherein the motion sensor is assigned to the same zone as the wireless photo sensor device.

15. The method of claim 14, wherein the wireless photo sensor device and the motion sensor have a coincident field of view, and wherein the wireless photo sensor device is further configured to provide sensor only in response to a commissioning request.

16. A computer-implemented method comprising:
monitoring, by one or more data processors, the joining of wireless photo sensor devices to a wireless network and the joining of wireless lighting devices to the network and that do not belong to a zone, and in response to the monitoring of the joining of wireless photo sensor devices and the joining of wireless lighting devices to the network:
selecting, by the one or more data processors, the wireless photo sensor devices;
selecting, by the one or more data processors, the wireless lighting devices;
assigning, by the one or more data processors, the wireless photo sensor devices and wireless lighting devices to respective zones, each respective zone based on one or more couplings between one or more wireless photo sensor devices and the wireless lighting devices in the respective zone, wherein the assigning comprises:
determining if either of the wireless photo sensor device or the wireless lighting device have been assigned to a zone;
in response to determining that the wireless photo sensor device has been assigned to a particular zone, assigning the wireless lighting device to the same zone; and
in response to determining that neither of the wireless photo sensor device nor the wireless lighting device have been assigned to a particular zone, generating a new zone and assigning the wireless photo sensor device and wireless lighting device to the new zone;
monitoring the joining of other wireless devices to the wireless network, and in response to the monitoring of the joining of an other wireless device to the wireless network:
for each zone that includes wireless lighting devices in response to the monitoring of the wireless lighting devices joining the network:
sequentially selecting each zone and instructing the wireless lighting devices belonging to that zone to change an illumination level so that only the wireless lighting devices of one zone change an illumination level at any one time;
monitoring for a zone confirmation signal for each the sequentially selected zone; and
in response to the monitoring of a zone confirmation signal, updating zone configuration data, specifying one or more zones to which wireless devices are assigned, so that the zone configuration data for the zone for which the zone confirmation signal was received specifies that the other wireless device belongs to the zone.

17. The method of claim 16, wherein monitoring for the zone confirmation signal comprises monitoring for a signal from the other wireless device.

18. A system, comprising:
a data processing apparatus; and
a computer storage medium encoded with a computer program, the program containing instructions that when executed by the data processing apparatus cause the data processing apparatus to perform operations including:
accessing zone configuration data specifying a plurality of zones in a wireless network and further specifying, for each zone, one or more wireless devices of a plurality of wireless devices that belong to the zone;
generating a first physical stimulus in an area by instructing wireless lighting devices belonging to a first zone to change an illumination level, the first physical stimulus being a change in an illumination level in the area;

in response to the first physical stimulus, receiving sensor data from a photo sensor device that can sense the first physical stimulus in the area and generate the sensor data in response to sensing the first physical stimulus, the photo sensor device not belonging to a zone and the area being an area in which are located other wireless devices belonging to the first zone as specified by the zone configuration data;

generating a commissioning event for the first zone including determining, from the sensor data, if the photo sensor device senses a change in the illumination level of the area that is proportional to the changing of the illumination level of the wireless lighting devices; and in response to determining that the photo sensor device senses a change in the illumination level of the area that is proportional to the changing of the illumination level of the wireless lighting devices, then generating the commissioning event; and in response to the sensor data and the commissioning event, updating the zone configuration data so that the zone configuration data specifies that the photo sensor device belongs to the first zone.

19. A system, comprising:

a data processing apparatus; and a computer storage medium encoded with a computer program, the program containing instructions that when executed by the data processing apparatus cause the data processing apparatus to perform operations including:

monitoring the joining of wireless photo sensor devices to a wireless network and the joining of wireless lighting devices to the network and that do not belong to a zone, and in response to the monitoring of the joining of wireless photo sensor devices and the joining of wireless lighting devices to the network:

selecting the wireless photo sensor devices;

selecting the wireless lighting devices;

assigning the wireless photo sensor devices and wireless lighting devices to respective zones, each respective zone based on one or more couplings between one or more wireless photo sensor devices and the wireless lighting devices in the respective zone, wherein the assigning comprises:

sequentially instructing wireless lighting devices that joined the network to change an illumination level so that only one wireless lighting device that joined the network changes an illumination level at any one time;

receiving photo sensor data from the wireless photo sensor devices;

determining, for each wireless photo sensor device from the photo sensor data for the wireless photo sensor device, if the photo sensor device senses a change in the illumination level that is proportional to the changing of the illumination level of the wireless lighting device;

in response to determining that the photo sensor device senses a change in the illumination level that is proportional to the changing of the illumination level of the wireless lighting device, assigning the photo sensor device and the wireless lighting device to a zone; and storing in a zone configuration data store zone configuration data specifying one or more zones to which the photo sensor devices and wireless lighting devices are assigned, the zone configuration data specifying, for each zone, wireless devices that belong to the zone.

20. A system, comprising:

a data processing apparatus; and a computer storage medium encoded with a computer program, the program containing instructions that when executed by the data processing apparatus cause the data processing apparatus to perform operations including:

monitoring the joining of wireless photo sensor devices to a wireless network and the joining of wireless lighting devices to the network and that do not belong to a zone, and in response to the monitoring of the joining of wireless photo sensor devices and the joining of wireless lighting devices to the network:

selecting the wireless photo sensor devices;

selecting the wireless lighting devices;

assigning the wireless photo sensor devices and wireless lighting devices to respective zones, each respective zone based on one or more couplings between one or more wireless photo sensor devices and the wireless lighting devices in the respective zone, wherein the assigning comprises:

determining if either of the wireless photo sensor device or the wireless lighting device have been assigned to a zone;

in response to determining that the wireless photo sensor device has been assigned to a particular zone, assigning the wireless lighting device to the same zone; and in response to determining that neither of the wireless photo sensor device nor the wireless lighting device have been assigned to a particular zone, generating a new zone and assigning the wireless photo sensor device and wireless lighting device to the new zone;

monitoring the joining of other wireless devices to the wireless network, and in response to the monitoring of the joining of an other wireless device to the wireless network:

for each zone that includes wireless lighting devices in response to the monitoring of the wireless lighting devices joining the network:

sequentially selecting each zone and instructing the wireless lighting devices belonging to that zone to change an illumination level so that only the wireless lighting devices of one zone change an illumination level at any one time monitoring for a zone confirmation signal for each the sequentially selected zone; and in response to the monitoring of a zone confirmation signal, updating zone configuration data, specifying one or more zones to which wireless devices are assigned, so that the zone configuration data for the zone for which the zone confirmation signal was received specifies that the other wireless device belongs to the zone.

\* \* \* \* \*

UNITED STATES PATENT AND TRADEMARK OFFICE
CERTIFICATE OF CORRECTION

PATENT NO. : 8,422,401 B1
APPLICATION NO. : 12/900960
DATED : April 16, 2013
INVENTOR(S) : Jason Yew Choo Choong Page 1 of 1

It is certified that error appears in the above-identified patent and that said Letters Patent is hereby corrected as shown below:

In the Claims

In Claim 20, Line 52, Column 24, delete "time" and insert -- time; --, therefor.

Signed and Sealed this
Second Day of July, 2013

Teresa Stanek Rea
*Acting Director of the United States Patent and Trademark Office*